United States Patent
Bruneau et al.

(10) Patent No.: US 11,764,423 B2
(45) Date of Patent: Sep. 19, 2023

(54) BATTERY COOLING PANEL FOR ELECTRIC VEHICLES

(71) Applicant: Taiga Motors Inc., Lasalle (CA)

(72) Inventors: Samuel Bruneau, Lasalle (CA); Dante Filice, Montreal (CA); Marc-Olivier Gagnon, Montreal (CA); CHristophe Petitclerc-Demers, Montreal (CA)

(73) Assignee: Taiga Motors Inc., Lasalle (CA)

( * ) Notice: Subject to any disclaimer, the term of this patent is extended or adjusted under 35 U.S.C. 154(b) by 253 days.

(21) Appl. No.: 17/091,777

(22) Filed: Nov. 6, 2020

(65) Prior Publication Data

US 2021/0135307 A1    May 6, 2021

Related U.S. Application Data

(60) Provisional application No. 62/931,335, filed on Nov. 6, 2019.

(51) Int. Cl.
| | |
|---|---|
| *H01M 10/6556* | (2014.01) |
| *H01M 10/613* | (2014.01) |
| *H01M 10/625* | (2014.01) |
| *H01M 10/6551* | (2014.01) |

(52) U.S. Cl.
CPC ..... *H01M 10/6556* (2015.04); *H01M 10/613* (2015.04); *H01M 10/625* (2015.04); *H01M 10/6551* (2015.04); *H01M 2220/20* (2013.01)

(58) Field of Classification Search
CPC ........... H01M 10/6556; H01M 10/613; H01M 10/625; H01M 10/6551; H01M 2220/20
See application file for complete search history.

(56) References Cited

U.S. PATENT DOCUMENTS

| | | | |
|---|---|---|---|
| 8,426,050 B2 | 4/2013 | Koetting et al. | |
| 8,628,872 B2 | 1/2014 | Koetting et al. | |
| 8,936,964 B2 * | 1/2015 | Hong | H01L 29/36 438/510 |
| 8,999,548 B2 | 4/2015 | Sun et al. | |
| 9,140,501 B2 | 9/2015 | Niedzwiecki et al. | |

(Continued)

FOREIGN PATENT DOCUMENTS

| | | | |
|---|---|---|---|
| CN | 108199119 | 6/2018 | |
| CN | 115692948 A * | 2/2023 | .......... H01M 10/613 |

(Continued)

OTHER PUBLICATIONS

International Search Report and Written Opinion in PCT International Application No. PCT/CA2020/051511 dated Jan. 13, 2021.

*Primary Examiner* — Amanda C. Walke

(74) *Attorney, Agent, or Firm* — Dicke, Billig & Czaja, PLLC

(57) ABSTRACT

A battery cooling panel and battery module are disclosed. In one example, the battery cooling panel includes a first outer panel defined as a first cooling fin with a first major surface configured to contact a battery cell. A second outer panel is secured to the first outer panel at an outer edge. A panel insert is positioned between the first outer panel and the second outer panel, the panel insert having a major surface with coolant flow channels. The battery module includes one or more battery cells in contact with the battery cooling panel, and is suitable for use as part of an electric vehicle system.

25 Claims, 15 Drawing Sheets

(56) References Cited

U.S. PATENT DOCUMENTS

| | | | |
|---|---|---|---|
| 9,620,829 B2 | 4/2017 | Haussmann | |
| 2011/0162820 A1 | 7/2011 | Weber et al. | |
| 2015/0079442 A1 | 3/2015 | Haussmann | |
| 2015/0140388 A1* | 5/2015 | Harada | H01M 10/6556 |
| | | | 429/120 |
| 2015/0244043 A1* | 8/2015 | Yum | H01M 50/519 |
| | | | 429/120 |
| 2016/0204398 A1* | 7/2016 | Moon | H01M 10/613 |
| | | | 429/120 |
| 2016/0248133 A1 | 8/2016 | Iqbal et al. | |
| 2018/0261897 A1 | 9/2018 | Kellner et al. | |
| 2019/0312319 A1* | 10/2019 | Choi | H01M 50/233 |
| 2020/0140037 A1 | 5/2020 | Haavikko et al. | |
| 2020/0153056 A1 | 5/2020 | Astecker et al. | |
| 2020/0161724 A1 | 5/2020 | Astecker et al. | |
| 2020/0227798 A1 | 7/2020 | Gaigg et al. | |
| 2020/0227800 A1 | 7/2020 | Gaigg et al. | |
| 2021/0167444 A1 | 6/2021 | Gaigg et al. | |
| 2021/0184291 A1 | 6/2021 | Gaigg et al. | |
| 2021/0234212 A1 | 7/2021 | Gaigg et al. | |
| 2022/0009589 A1 | 1/2022 | Matsushita | |
| 2022/0017181 A1 | 1/2022 | Suzuki et al. | |
| 2022/0063764 A1 | 3/2022 | Matsushita | |
| 2022/0111929 A1 | 4/2022 | Matsushita | |

FOREIGN PATENT DOCUMENTS

| | | | | |
|---|---|---|---|---|
| KR | 20160132596 A | * | 11/2016 | H01M 2/08 |
| WO | 2013/139905 | | 9/2013 | |
| WO | 2013/139908 | | 9/2013 | |
| WO | WO-2015160115 A1 | * | 10/2015 | H01M 10/0413 |
| WO | WO-2017193880 A1 | * | 11/2017 | H01M 10/613 |
| WO | 2021/084520 | | 5/2021 | |

* cited by examiner

SECTION C-C

DETAIL D

BATTERY COOLING PANEL FOR ELECTRIC VEHICLES

CROSS-REFERENCE TO RELATED APPLICATIONS

This Utility patent application claims priority to U.S. Ser. No. 62/931,335 filed Nov. 6, 2019, which is incorporated herein by reference.

BACKGROUND

Electric Vehicles (EV) have rechargeable batteries to store energy and provide power for the vehicle. The battery is charged/recharged either by regenerative braking which converts some of the vehicle's kinetic energy into electrical energy or directly from a power grid through a charging station. The battery is discharged to power the vehicle and other accessories. The flow of current during the charging and discharging processes creates heat in the battery cells. The higher the electric current, the greater the heat created in the battery.

Current EVs use lithium ion battery cells. However, the performance of the lithium ion battery cell is greatly dependent on temperature. When overheated, the cells can experience accelerated deterioration, cell damage, and other undesirable effects. In addition, when exposed to a very low temperature, the operating efficiency and power capacity of the cells will be decreased. Furthermore, uneven temperature distribution is another problem of the lithium cells. This is caused by variable current in a cell, excessive local temperature, the thermal conductivity of the case, or the placement of cathodes and anodes. The uneven temperature distribution typically results in local deterioration and reduction of battery lifespan. Thus, the lithium ion batteries typically require thermal management systems to maintain a constant temperature with very low temperature deviations so that they can operate efficiently without damages or failures.

For these and other reasons, there is a need for the present invention.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

The present disclosure provides a battery cooling panel for an electric vehicle that achieves high cooling efficiency while keeping the total cost low. When part of a battery module, the battery cooling panel provides for uniform cooling and uniform pressure distribution across battery cell surfaces improving battery performance. The battery cooling panel is configured to be used with a prismatic battery cell, such as a lithium ion battery cell, within a vehicle battery module. Additionally, the present disclosure provides a battery module, battery stack and electric vehicle including the battery cooling panel disclosed herein.

Figure 1:
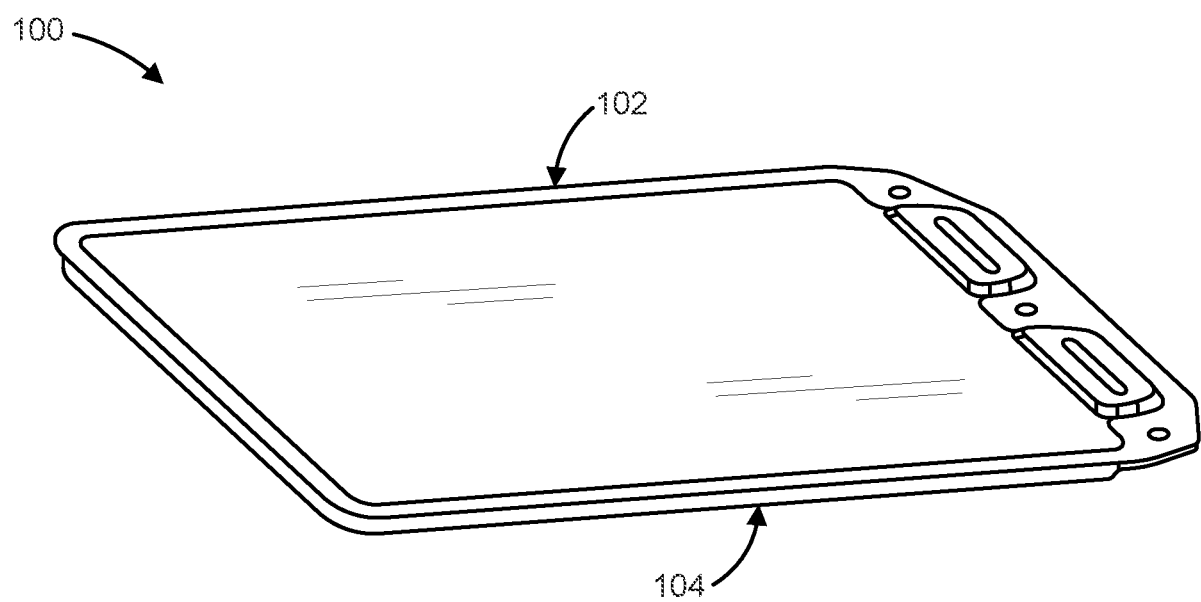
FIG. 1 is a perspective view of one example of a battery cooling panel.
Figure 2:
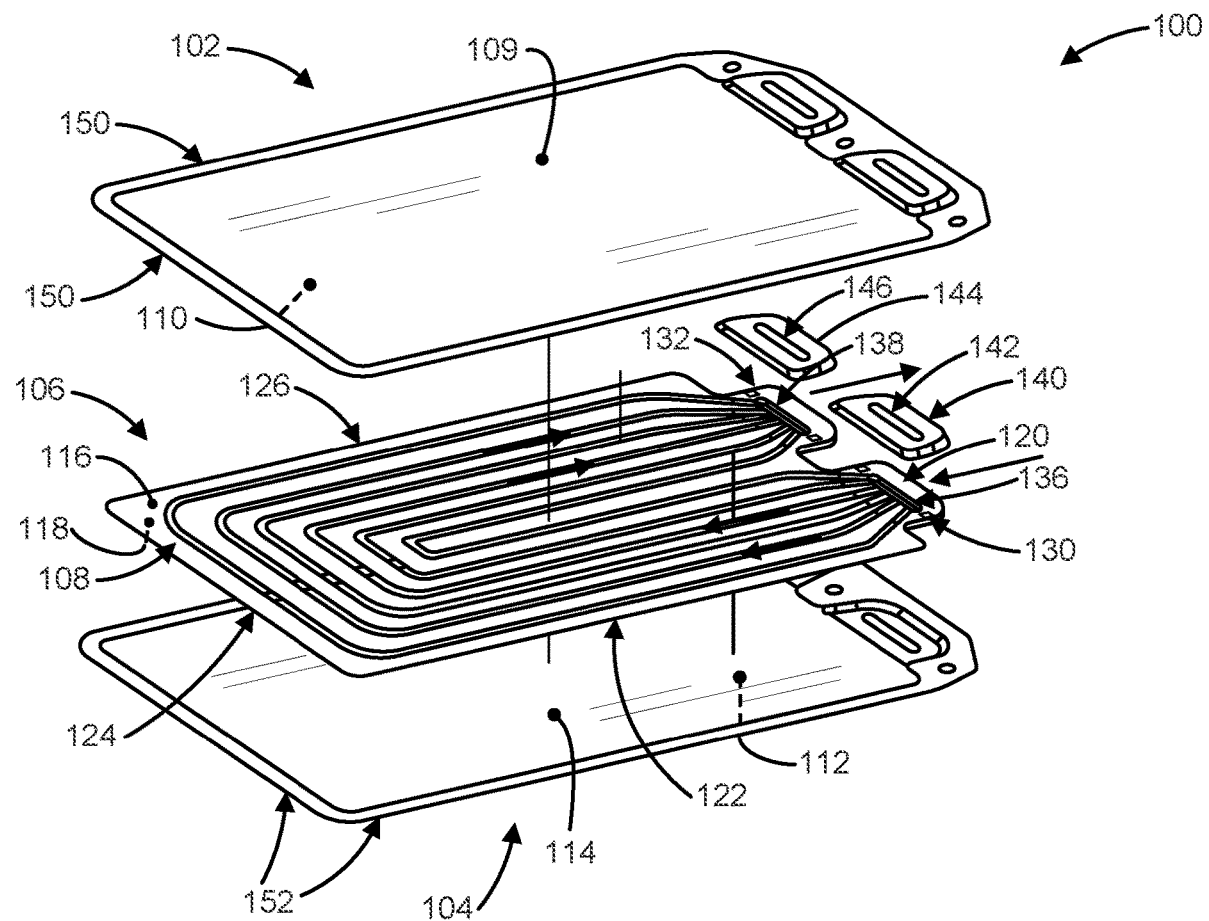
FIG. 2 is one example of an exploded view of the panel of FIG. 1.

FIG. 1 illustrates one embodiment of a battery cooling panel generally at 100. FIG. 2 is an exploded view of the battery cooling panel 100. Battery cooling panel 100 provides for efficient and uniform cooling of a battery cell, such as a prismatic battery cell. In one example, the battery cooling panel is useful for cooling a lithium ion battery cell in an electric vehicle.

Battery cooling panel includes a first outer panel 102 and a second outer panel 104. The first outer panel 102 is defined as a cooling fin. The first outer panel 102 is configured to contact a battery cell (not illustrated in FIG. 1). The second outer panel 102 can also be defined as a cooling fin. A panel insert 106 is positioned between the first outer panel 102 and the second outer panel 104. The panel insert 106 includes cooling flow channels 108 to aid in cooling the battery cell.

The first outer panel 102 and the second outer panel 104 operate to enclose the panel insert 106, allowing a coolant to flow through the cooling flow channels within the battery cooling panel. The first outer panel 102 includes a first major surface 109 and a second major surface 110. The first major surface 109 is configured to contact the battery cell. The second outer panel 104 includes a first major surface 112 and a second major surface 114. The second outer panel 104 may also contact a battery cell at second outer panel first major surface 112. In one embodiment, both of the first outer panel first major surface 109 and the second outer panel first major surface 112 are substantially planar. The panel insert 106 is positioned between the first outer panel 102 and the second outer panel 104. In some embodiments, the panel insert 106 is more rigid relative to the first outer panel 102. In some embodiments, the first outer panel 102 and second outer panel 104 are each made of a thin film sheet, and the panel insert 106 is rigid relative to both the first outer panel 102 and the second outer panel 104.

The panel insert 106 includes a first surface 116 and a second surface 118. The first surface 116 faces first outer panel second major surface 110, and the second surface 118 faces second outer panel second major surface 114. The first surface 116 includes cooling flow channels 108 that aid in cooling a battery cell.

The panel insert 106 is made of a polymeric material. In one example, the polymeric material is polyethylene (PE). In another example, the polymeric material is polypropylene. Channels 108 comprise open grooves that are formed or molded in the polymeric material. In other examples, the channels can be formed in another manner such as by cutting, etching or abrading grooves in the surface of the polymeric material. The grooves or channels 108 extend entirely through panel insert 106, and are open to both the first outer panel 102 and the second outer panel 104. In another example, the grooves or channels 108 extend only partially through the panel insert 106.

The channels 108 run from an edge of panel insert 106, throughout the panel insert 106, and back to an edge of the panel insert. In one embodiment, panel insert 106 includes an edge 120, 122, 124 and 126. An inlet channel endplate 130 and an outlet channel endplate 132 are located at edge 120. Inlet channel endplate 130 and outlet channel endplate 132 can be separate pieces or extend from panel insert 106. Channels 108 begin at inlet channel endplate 130, run throughout panel insert 106 (e.g., in a circular or semi-circular manner) and exit at outlet channel endplate 132. Inlet channel endplate 130 includes an opening 136 to allow coolant to flow into channels 108. Outlet channel endplate 132 includes an opening 138 to allow coolant to exit or flow out of channels 108. In this manner, coolant enters panel insert 106 at inlet channel endplate 130, flows through the channels 108 removing excess heat from a battery cell through the cooling panel assembly, and exiting at outlet channel endplate 132. Inlet channel endplate 130 may also include an endplate cover 140 having an opening 142 that aligns with opening 136. Outlet channel endplate 132 may also include an endplate cover 144 having an opening 146 that aligns with opening 138.

Figure 3:
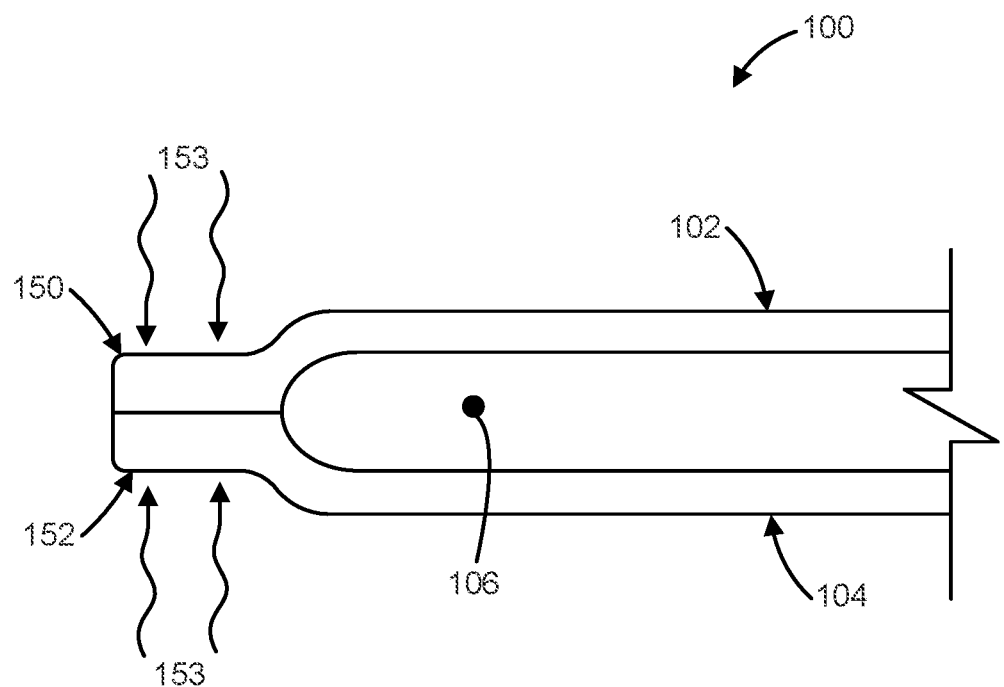
FIG. 3 is a partial cross-sectional view illustrating one example of an edge seal.
Figure 4:
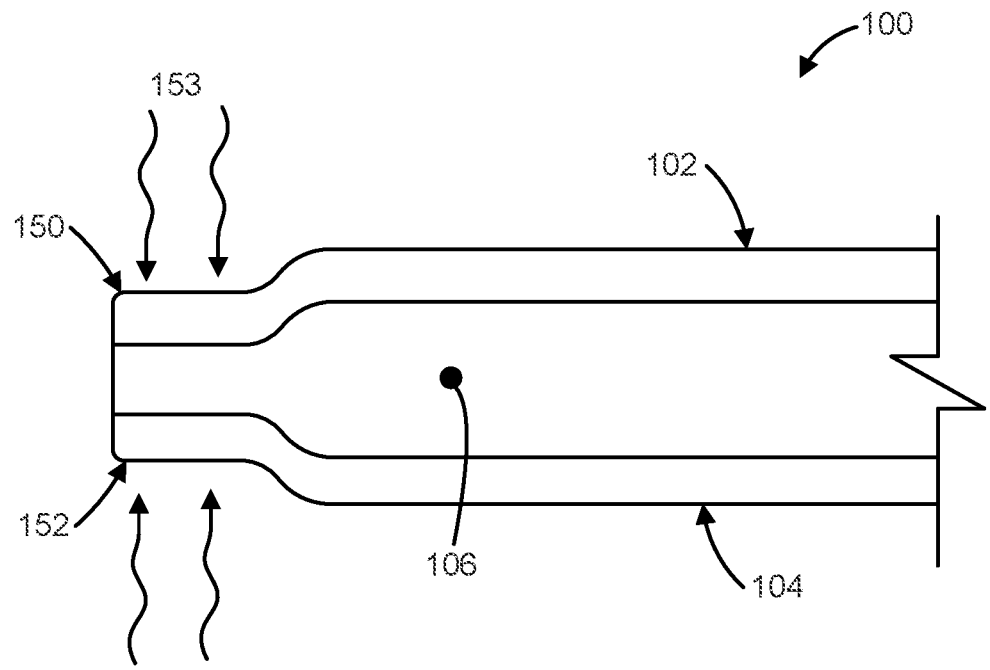
FIG. 4 is a partial cross-sectional view illustrating another example of an edge seal.

First outer panel 102 and second outer panel 104 are made in the form of a sheet. In one example, the panels 102, 104 are made of a thin film sheet of polymeric material. The first outer panel 102 is secured to the second outer panel 104 at their outer edges 150, 152, respectively. The first outer panel 102 can be sealed to the second panel 104, for example, by heat sealing, pressure sealing, and/or by using an added adhesive. FIG. 3 illustrates an end portion of battery cooling panel 100 where first outer panel 102 is sealed to second outer panel 104 at outer edges 150, 152 using heat sealing treatment 153. Panel insert 106 is positioned inside the battery cooling panel 100, and allowed to securely float in between the first outer panel 102 and the second outer panel 104. FIG. 4 illustrates another example at an end portion of battery cooling panel 100 where first outer panel 102, second outer panel 104 and panel insert 106 are all heat sealed 153 at an outer edge. It is recognized that the first outer panel 102 and the second outer panel 104 may be selectively sealed to panel insert 106 at locations other than near the outer edge of the battery cooling panel 100.

Further, when first outer panel 102 and second outer panel 104 are sealed about panel insert 106, the sheet material of panels 102,104 tends to deform about all parts of the panel insert 106 due to the properties of the sheet material. As such, once sealed together, the first outer panel 102 and second outer panel 104 are securely pressed against the panel insert 106.

The first outer panel 102 and second outer panel 104 when made of a thin film sheet or foil may be formed of a single layer or multiple layers. Advantages of layered thin film sheets include very light weight, ease of manufacture, and being inexpensive for material costs and manufacture. Further advantages include durability and structural soundness.

Figure 5:
FIG. 5 is one example of an outer panel.

FIG. 5 illustrates at 160 one embodiment of an outer panel sheet formed of a single layer 162 of polymeric material. In one or more examples, the polymeric material is polyethylene, polythene, or polyethylene terephthalate (i.e., a polyester). The thin film sheet can be made of low density or high density materials. In one embodiment, the thin film sheet has a thickness in the range of 5 microns-50 microns, with a weight in the range of 20 grams-200 grams.

Figure 6:
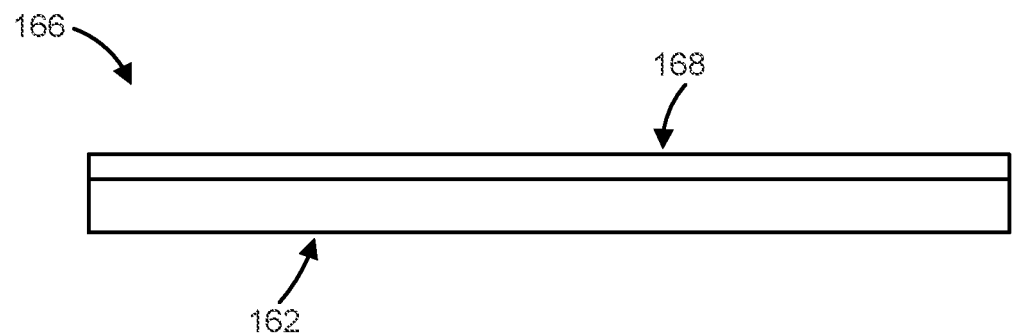
FIG. 6 is another example of an outer panel.

FIG. 6 illustrates at 166 one embodiment of an outer panel sheet formed of multiple layers. In this embodiment, the sheet 166 includes layer 162 formed of a polymeric material with a second layer 168 different from the first layer. In one embodiment, the second layer 168 is a metal film or foil layer. In one example, the second layer 168 is an aluminum coated thin film layer. The advantages of second layer 168 include enhanced barrier and structural properties. The second layer 168 may additionally provide a matt surface, a shiny surface or decorative surface properties. The metal film layer is very thin, in a range of 5-50 micrometres.

Figure 7:
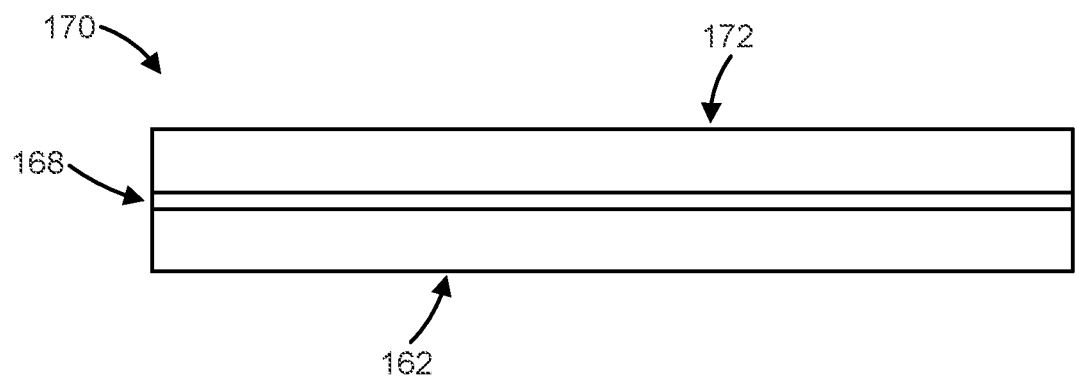
FIG. 7 is another example of an outer panel.

FIG. 7 illustrates at 170 one embodiment of an outer panel sheet formed of multiple layers. In this embodiment, the sheet 170 includes layer 162, layer 168, and an additional foil or layer 172. Layer 172 can be formed of a metallic or polymeric material. In one example, layer 162 is a polymeric material, layer 168 is a metal layer, and layer 170 is a polymeric material. The layer 172 is an outer foil that can provide additional resistance to scratches, tears and other outside influences such as interfacing with a battery cell.

Figure 8:
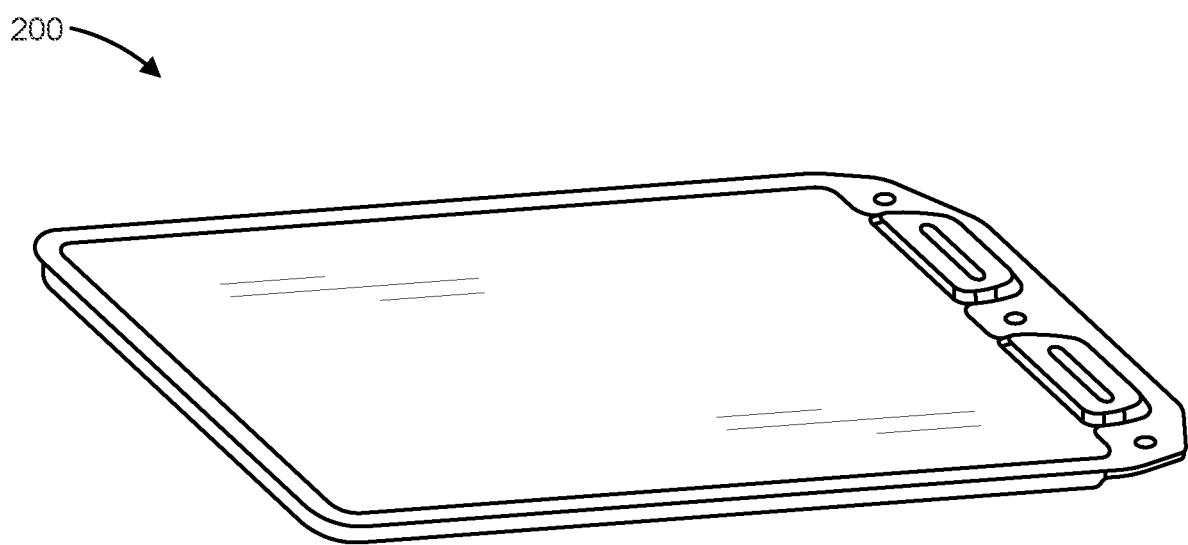
FIG. 8 is another example of a battery cooling panel assembly.
Figure 9:
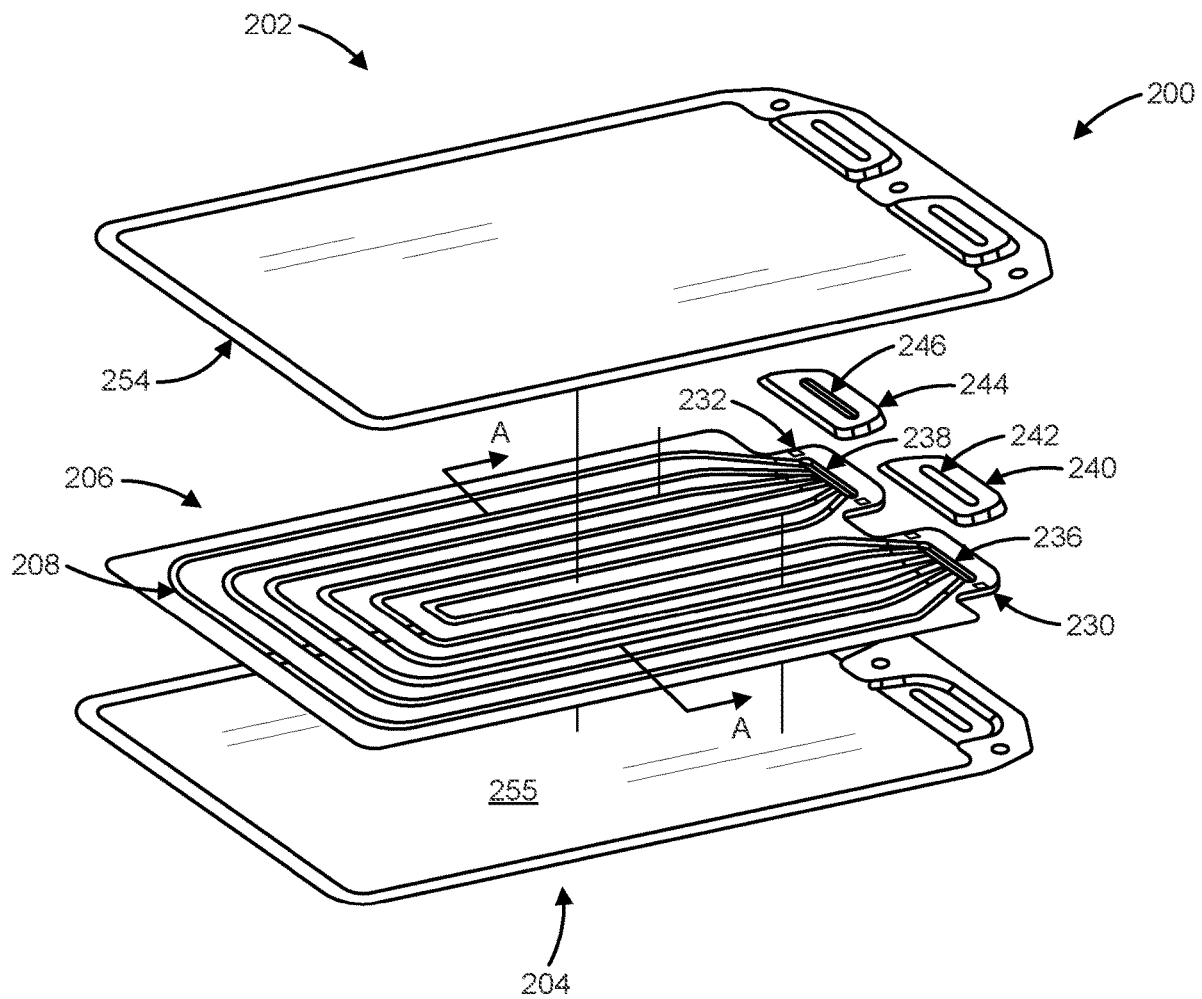
FIG. 9 is one example of an exploded view of the panel of FIG. 8.

FIG. 8 illustrates another embodiment of a battery cooling panel generally at 200. FIG. 9 is an exploded view of the battery cooling panel 200. Battery cooling panel 200 is similar to battery cooling panel 100 previously described herein and similar elements are labeled with similar element numbers. Battery cooling panel 200 provides for efficient and uniform cooling of a battery cell, such as a prismatic battery cell. In one example, the battery cooling panel 200 is used for cooling a lithium ion battery cell in an electric vehicle.

Battery cooling panel 200 includes a first outer panel 202 and a second outer panel 204. The first outer panel 202 is defined as a cooling fin. The first outer panel 202 is configured to contact a battery cell. The second outer panel 202 can also be defined as a cooling fin. A panel insert 206 is positioned between the first outer panel 202 and the second outer panel 204. The panel insert 206 includes cooling flow channels 208 to aid in moving coolant through the battery cooling panel 200 to aid in cooling the battery cell.

The first outer panel 202 and the second outer panel 204 operate to enclose the panel insert 206, allowing a coolant to flow through the cooling flow channels within the battery cooling panel. The first outer panel 202 includes a first major surface 209 and a second major surface 210. The first major surface 209 is configured to contact the battery cell. The second outer panel 204 includes a first major surface 212 and a second major surface 214. The second outer panel 204 may also contact a battery cell at the second outer panel first major surface 212. In one embodiment, both of the first outer panel first major surface 209 and the second outer panel first major surface 212 are substantially planar, maximizing contact surface area with the battery cell. The panel insert 206 is positioned between the first outer panel 202 and the second outer panel 208.

Figure 10:
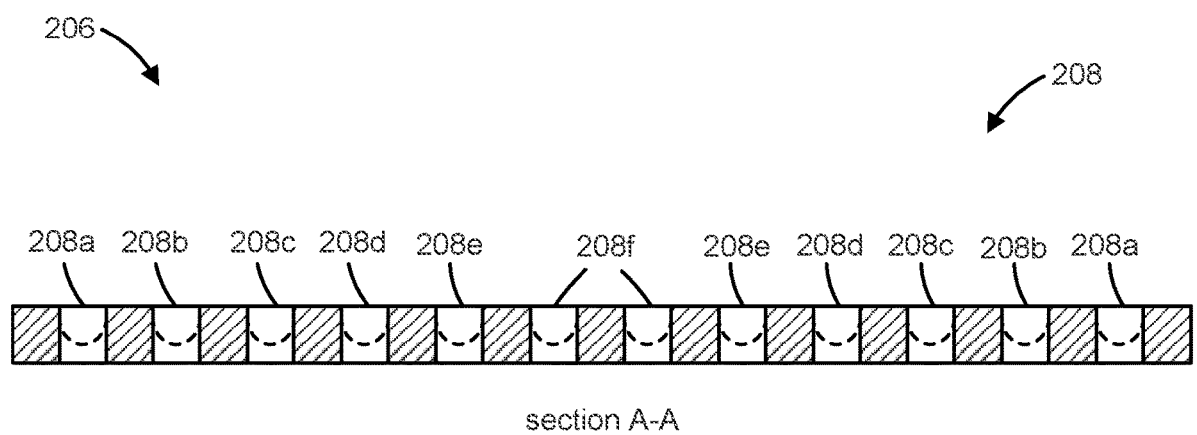
FIG. 10 is a cross-sectional view of the panel insert of FIG. 9.

The first outer panel 202 and the second outer panel 208 are made of a generally rigid polymeric material or metal such as aluminum. The panel insert 206 is made of a generally rigid polymeric material. In one example, the first outer panel 202 is made of aluminum, and includes a formed well area 254 on the second major surface 210. Similarly, the second outer panel 204 includes a formed well area 255. When assembled, first outer panel 202 is secured to second outer panel 204 at their outer edges, such as be welding or an adhesive. In the assembled position, the panel insert 206 fits securely within the area formed by well area 254 and well area 255. FIG. 10 illustrates one example cross-section of panel insert 206. In this example, panel insert 206 includes 6 channels spaced about the panel insert, indicated as 208a, 208b, 208c, 208d, 208e and 208f. The channels extend entirely through the panel insert 206. Alternatively, the channels may only extend partially through the panel insert 206 (illustrated by dashed grooves).

Figure 11:
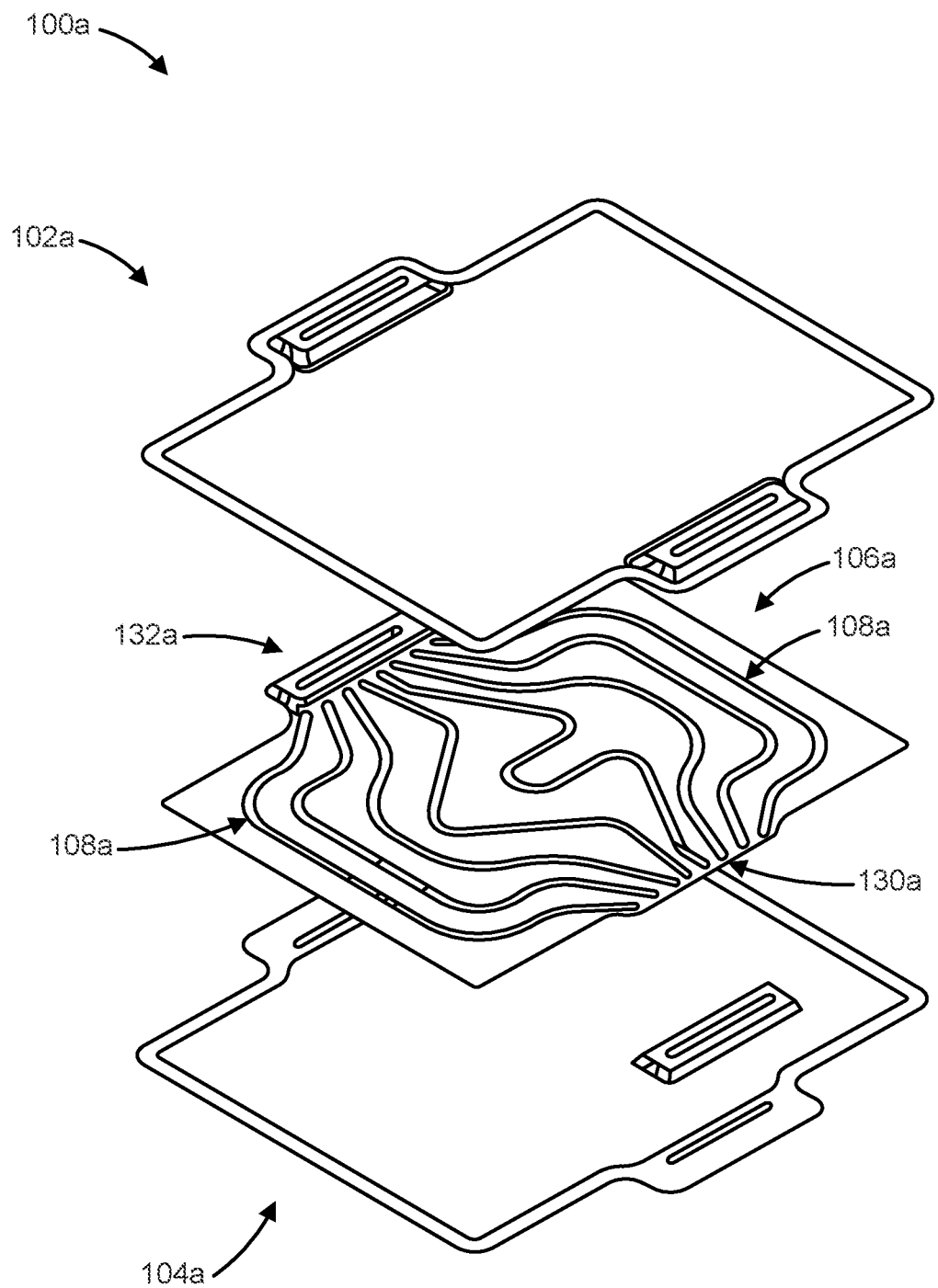
FIG. 11 is another example of a battery cooling panel assembly.

FIG. 11 is an expanded view illustrating another embodiment of a battery cooling panel generally at 100a that is similar to battery cooling panel 100, and where like elements include the same element number with an "a" added. The first outer panel 102a is defined as a cooling fin. The first outer panel 102a is configured to contact a battery cell (not illustrated in FIG. 1). The second outer panel 104a can also be defined as a cooling fin. A panel insert 106a is positioned between the first outer panel 102 and the second outer panel 104. The panel insert 106a includes cooling flow channels 108a to aid in cooling the battery cell. In this embodiment, cooling flow channels 108a start and end on different sides of the panel insert 106a, and as such on different sides of the battery cooling panel 100a. In this example, inlet channel endplate 130a is on one side of the panel insert 106a and outlet channel endplate 130b is at an opposite side of the panel insert 106a. There are eight separate cooling flow channels 108a illustrated, that generally form a circuitous or varied (i.e., not straight) path through the panel insert 106a from inlet channel endplate 130a to outlet channel endplate 132a to aid in maximizing and providing a uniform cooled surface in contact with a battery cell.

Other alternative embodiments for the battery cooling panel illustrated in FIGS. 1-11 are contemplated without departing from the scope of the present disclosure. In one example, the battery cooling panel includes first outer panel 102 secured directly to panel insert 106. In this example, panel insert 106 acts as both the panel insert with coolant flow channels and the second outer panel. Alternatively, the channels may not extend entirely through the panel insert. In this example, there may or may not be a need for a second outer panel. In another example, the battery cooling panel includes a first outer panel and a second outer panel, where the coolant flow channels are formed integral the second outer panel. In this embodiment, the channel structure and also other parts such as the channel plate may be formed integral the second outer panel.

Figure 12:
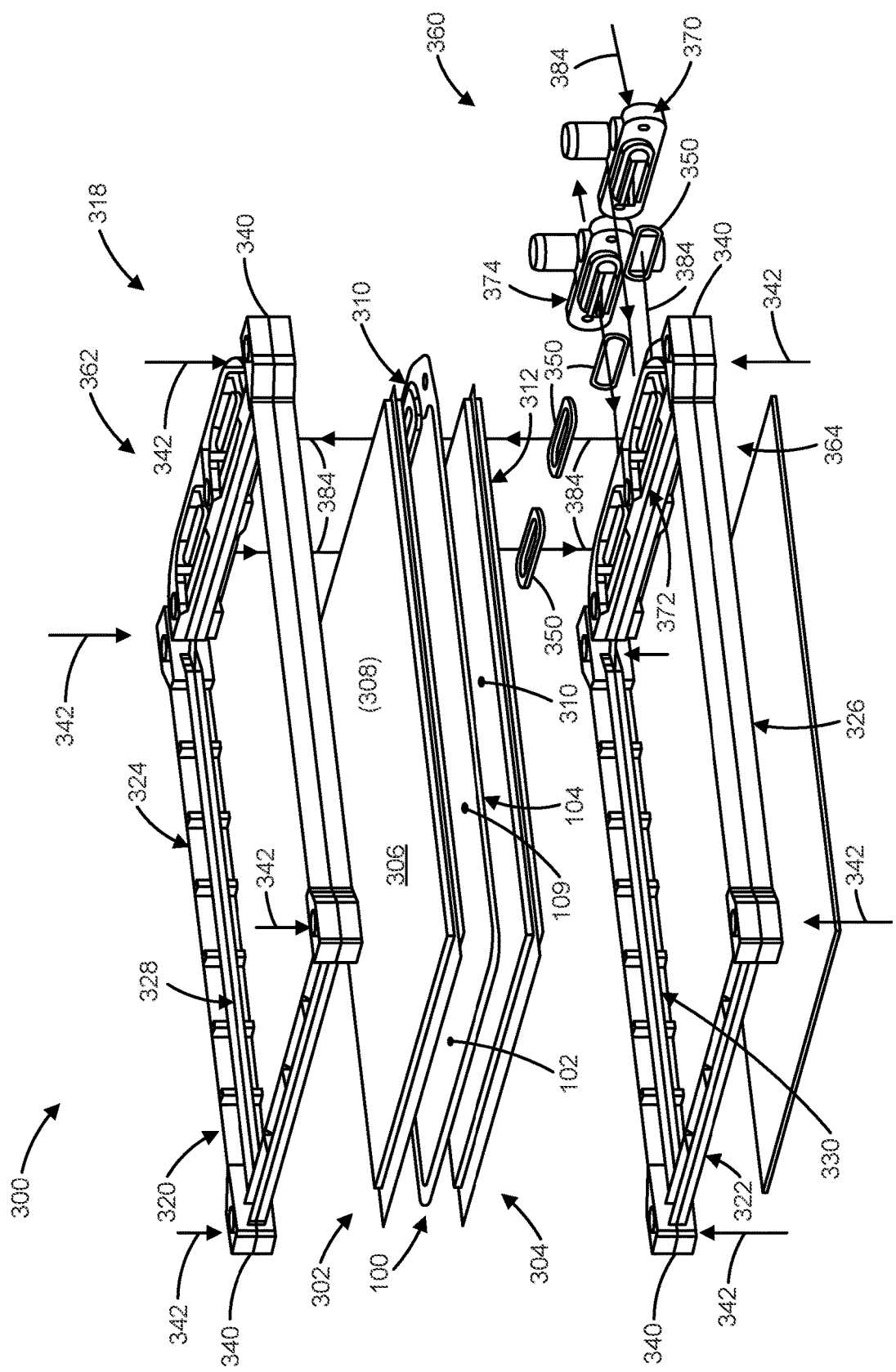
FIG. 12 is an exploded perspective view of one example of a battery module.

FIG. 12 is an exploded view illustrating one embodiment of a battery module generally at 300. The battery module 300 is suitable for use in an electric vehicle. The battery module 300 includes a battery cooling panel immediately adjacent one or more battery cells. Battery module 300 further includes a manifold system for moving coolant in and out of the battery module, and specifically through the battery cooling panel contained within the batter module.

In this embodiment, the battery cells are prismatic battery cells such as a lithium ion battery cell. The battery cooling panel is similar to the battery cooling panel 100 and battery cooling panel 200 described herein, and provides an efficient cost effective way to cool a battery cell. The present design maximizes the cooling surface area at an interface between the battery cooling panel and the battery cell.

Battery module 300 is in a stack configuration as illustrated. Battery module 300 includes battery cooling panel 100. Battery cooling panel 100 is positioned between a first battery cell 302 and a second battery cell 304. Battery cell 302 and battery cell 304 are prismatic battery cells. In one example, battery cells 302 and 304 are lithium ion battery cells. Battery cell 302 includes a first battery surface 306 and a second battery surface 308 (not shown). Second battery surface 308 is a generally planar batter surface. Battery cooling panel 100 includes generally planar first outer panel 102 immediately adjacent and having first outer panel first major surface 109 in contact with first battery surface 306. In one aspect, the cooling surface of first outer panel first major surface 109 is in total contact with first battery surface 306. Similarly, battery cell 304 includes a first battery surface 310 and a second battery surface 312. First battery surface 310 is a generally planar battery surface. Battery cooling panel 100 includes generally planar second outer panel 104 (not shown) immediately adjacent and having second outer panel first major surface 112 (not shown) in contact with first battery surface 310. In one aspect, the cooling surface of second outer panel first major surface 112 is in total contact with first battery surface 310.

Battery module 300 further includes cartridge assembly 318. Cartridge assembly 318 securely retains first battery cell 302, cooling panel 100 and second battery cell 304 together in order to maximize cooling efficiency and uniformity of the batteries by battery cooling panel 100. In one example, cartridge assembly 318 is made of a relatively hard, lightweight polymeric material. Cartridge assembly 318 includes first frame member 320 and second frame member 322. The frame members 320, 322 are generally rectangular shaped and each include an outer wall 324, 326. A retention ledge 328, 330 extends inward from a corresponding outer wall 324, 326. When secured together at corners 340, retention ledges 328, 330 operate to securely retain the first battery cell 302, the battery cooling panel 100, and the second battery cell 304 within battery module 300 (illustrated by retention directional arrows 342). Battery module 300 may further include one or more gaskets 350 to maintain fluid seals within the battery module.

A manifold system 360 is in fluid communication with battery module 300 for moving coolant into and out of the battery module 300. In one aspect, each cartridge frame member 320, 322 include a cartridge frame manifold 362, 364 having an opening in communication with manifold system 360 for bringing coolant into and out of battery cooling panel 100. In one mode of operation, coolant flows from inlet manifold 370, into cartridge inlet manifold 372, and enters battery cooling panel 100 inlet channel endplate 130 where coolant accesses the panel insert channels 108 for cooling battery cells 302,304. The coolant moves through the battery cooling panel 100 channels 108, and exits the cooling panel 100 at outlet channel endplate 132 (not shown). Outlet channel endplate 132 is in fluid communication with cartridge outlet manifold 374 where the coolant exits the battery module via outlet manifold 380. Further, coolant moves to additional battery modules via first frame member 320 and second frame member 322. Arrows illustrate a coolant flow path through the battery module 300, at 384.

Figure 13:
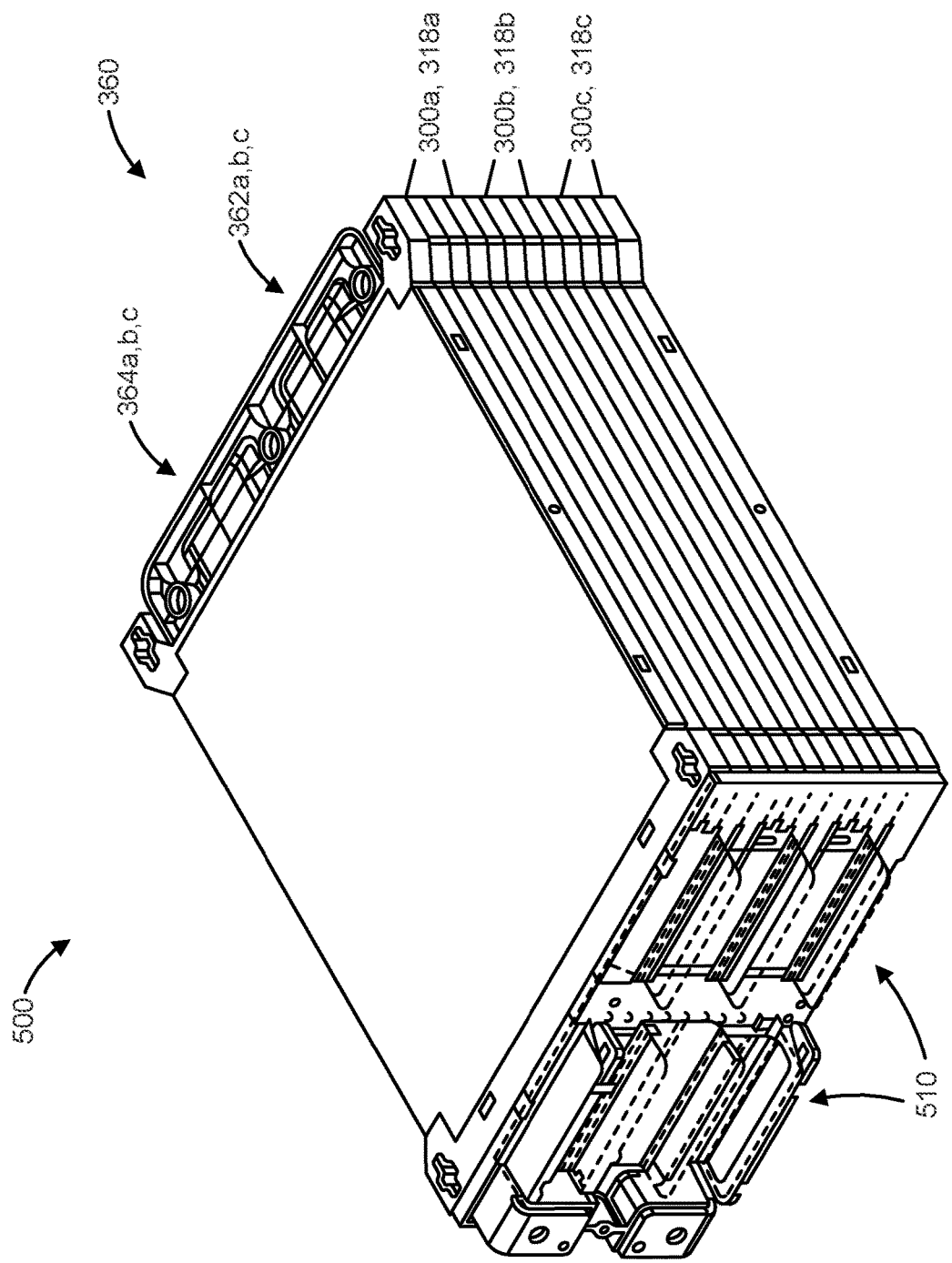
FIG. 13 is a perspective view illustrating one example of a battery stack.

FIG. 13 illustrates one example of a battery stack for use in an EV generally at 500. The battery stack 500 includes multiple battery modules 300a, 300b and 300c connected together via their cartridge assemblies 318a, 318b and 318c. The manifold system 360 allows for coolant flow through the entire battery stack 500 via the cartridge frame manifolds 362a,b,c and cartridge frame manifolds 364a,b,c. Battery connectors or in the form of blades 510 (positive and negative) are battery connection posts that extend from individual batteries located within the battery stack. The battery stack couples to an EV drivetrain via the battery connectors 510.

Figure 14:
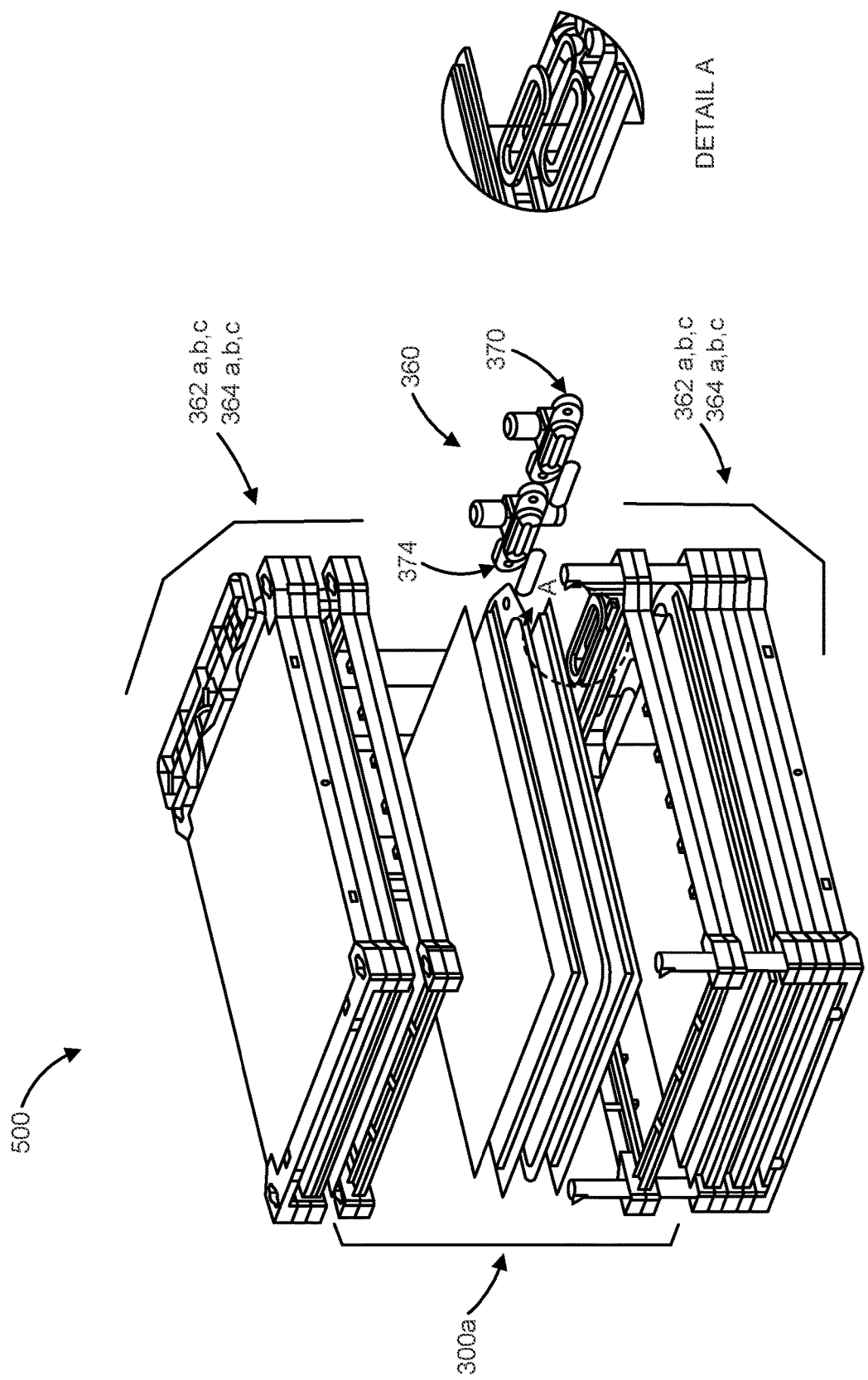
FIG. 14 is an exploded view illustrating one example of the battery stack of FIG. 13.

FIG. 14 is an expanded view of the battery stack 500. As illustrated, a battery module 300 is illustrated as part of the stack. Further, manifold system 360 includes cartridge inlet manifold 370 and cartridge outlet manifold 374 in fluid communication with the battery cooling panels located within the battery stack 500. In this example, only one cartridge inlet manifold 370 and one cartridge outlet manifold 372 is needed to provide coolant flow to and from the entire battery stack 500. Coolant flow is provided in and out of the battery cooling panels via cartridge cooling manifolds 362a,b,c and 364a,b,c.

Figure 15:
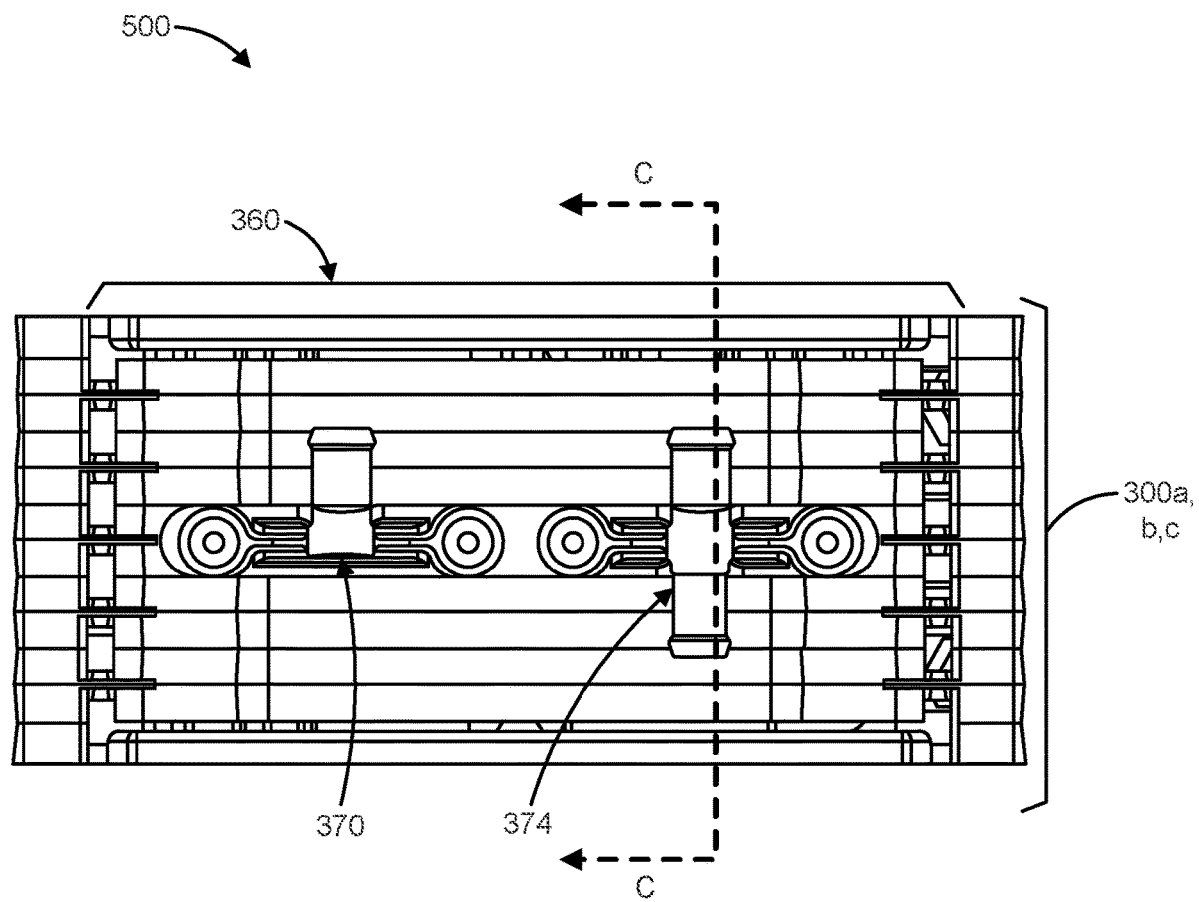
FIGS. 15-17 are enlarged cross-sectional views of a manifold system.
Figure 16:
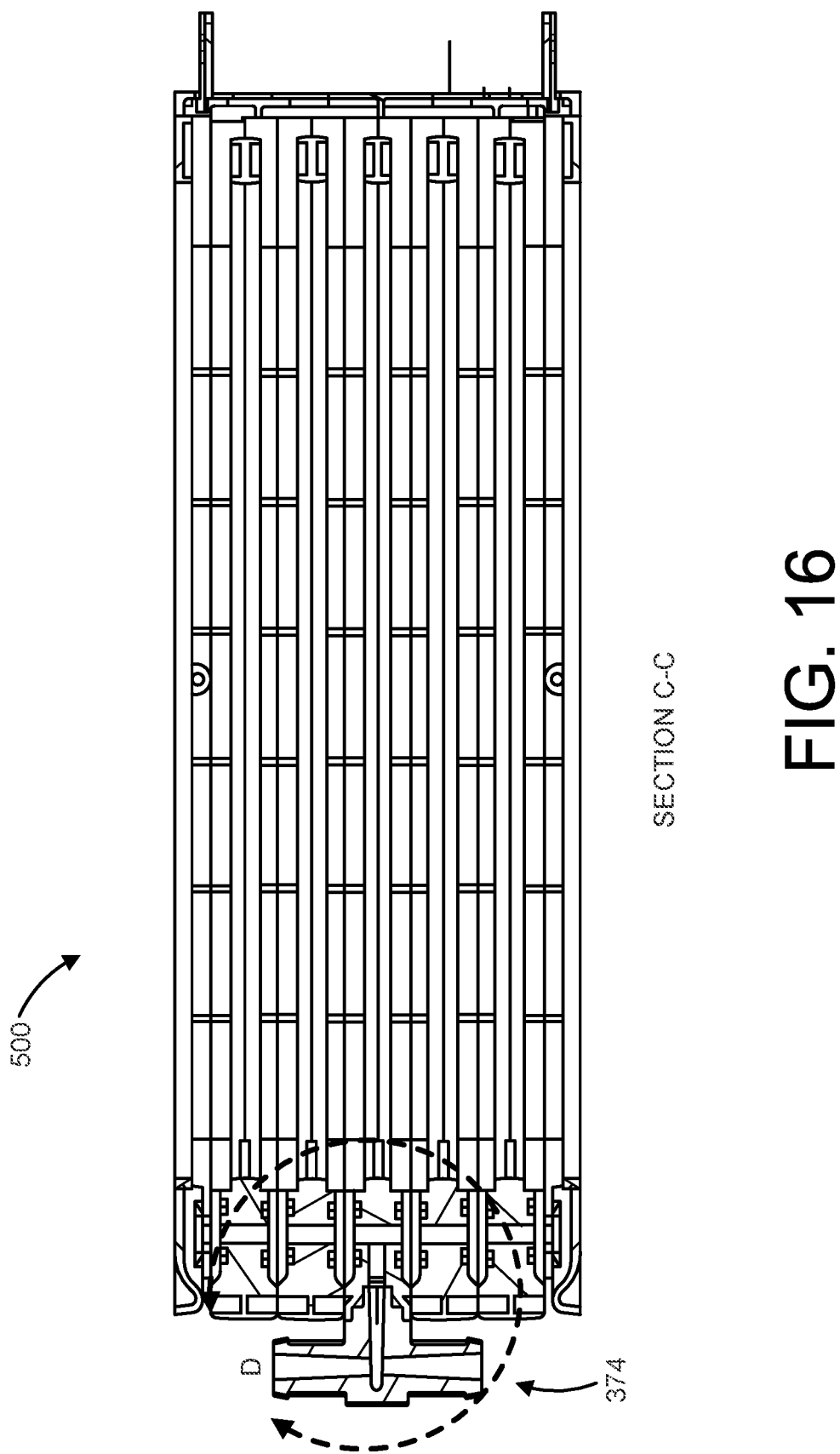
Figure 17:
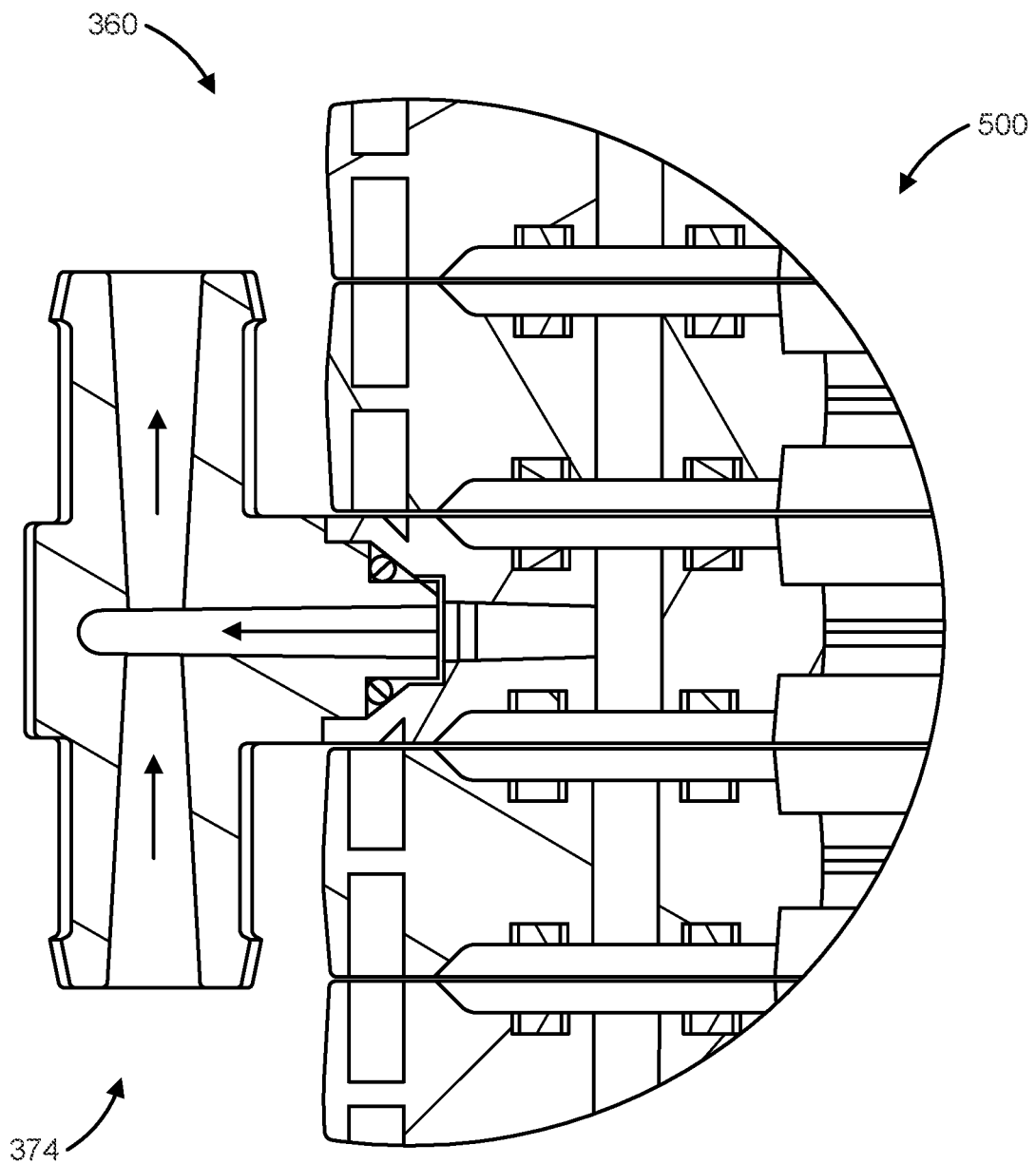

FIG. 15 is an end view of the battery stack 500 illustrating the manifold system 360. FIG. 16 is a cross-section of the battery stack 500 along line C-C of FIG. 15. FIG. 17 is an enlarged partial view of the manifold system 360 as the coolant flow path enters battery stack 500.

Figure 18:
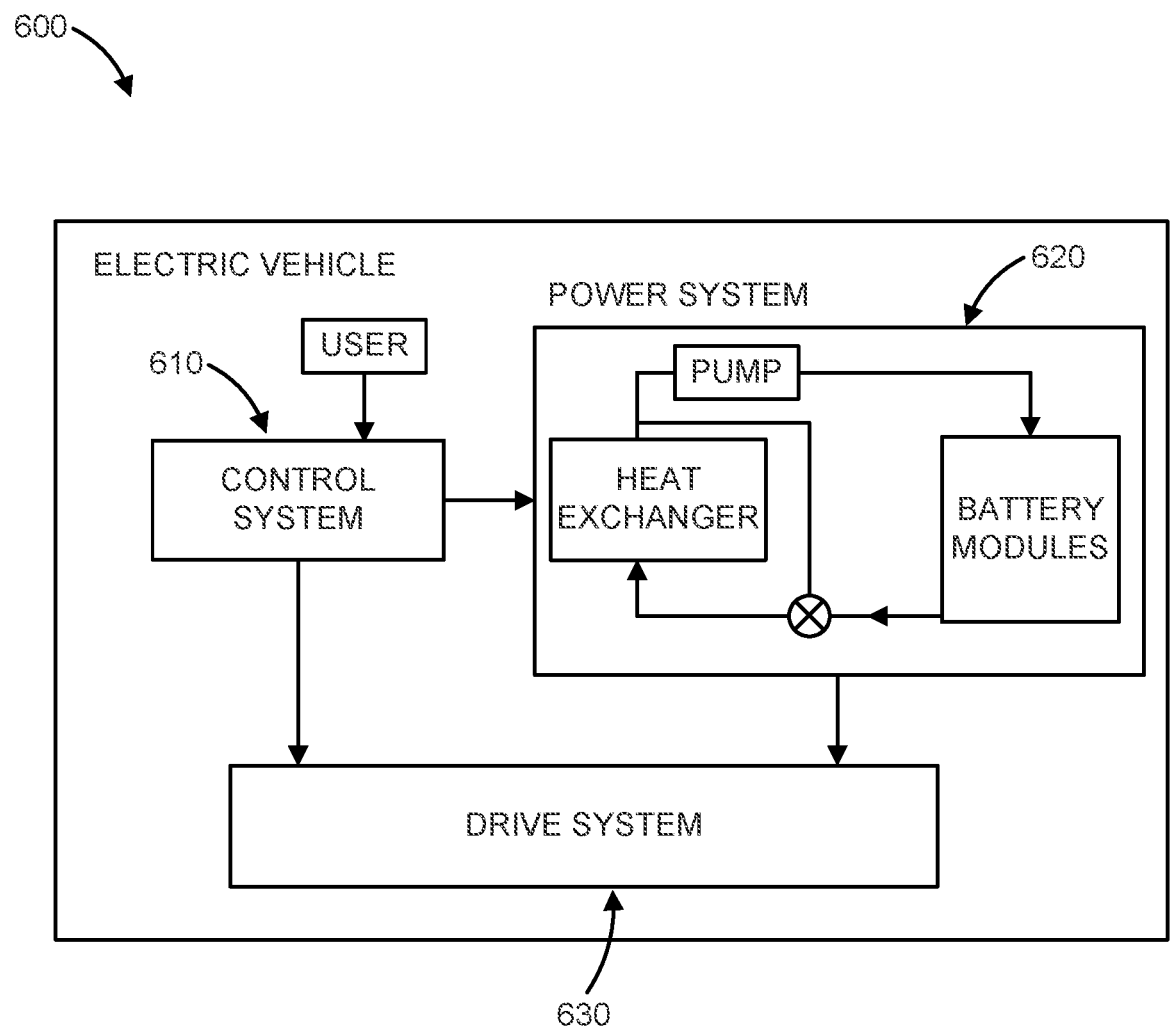
FIG. 18 is a block diagram illustrating an electric vehicle.

FIG. 18 is a block diagram illustrating on example of an electric vehicle having one or more battery modules 300, generally at 600. The electric vehicle 600 includes control system 610, electric power system 620 and electric drive system 630. Electric power system includes a battery stack 500 having multiple battery modules 300 having battery cooling panels as detailed herein. Electric power system may include a number of other systems to aid in supplying power to the electric vehicle, including a valve system, a heat exchanger, coolant pump, etc. In operation, a user 650 interfaces with the control system to operate the electric vehicle. The control system communicates with the power system 620 and drive system 630 to operate the electric vehicle as desired.

The power system 620 includes battery modules that include a battery cooling panels that achieves high cooling efficiency while keeping the total cost low. As part of the battery modules, the battery cooling panel provides for uniform cooling and uniform pressure distribution across battery cell surfaces improving battery performance and overall electric vehicle performance. The battery cooling panel is configured to be used with a prismatic battery cell, such as a lithium ion battery cell, within the electric vehicle battery module.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. For example, although various embodiments disclosed herein are directed for use with prismatic battery cells, and in one specific example Lithium Ion battery cells, it is contemplated that ideas of the present disclosure may be used with other types of batteries. Therefore, it is intended that this disclosure be limited only by the claims and the equivalents thereof.

The invention claimed is:

1. A battery cooling panel comprising:
   a first outer panel defined as a first cooling fin with a first major surface configured to contact a battery cell;
   a second outer panel secured directly to the first outer panel at an outer edge; and
   a panel insert positioned between the first outer panel and the second outer panel, the panel insert having a major surface having coolant flow channels formed therein.

2. The battery cooling panel of claim 1, comprising:
   a manifold assembly in fluid communication with the coolant flow channels for moving coolant through the battery cooling panel.

3. The battery cooling panel of claim 2, the manifold assembly further comprising:
   an inlet manifold assembly in fluid communication with the coolant flow channels; and
   an outlet manifold assembly in fluid communication with the coolant flow channels.

4. The battery cooling panel of claim 2 comprising where the manifold assembly includes an inlet channel endplate and an outlet channel endplate, and where in operation fluid enters the panel insert at the inlet channel endplate and exits the panel insert at the outlet channel endplate.

5. The battery cooling panel of claim 4, where the inlet channel endplate and the outlet channel endplate are located along a common edge of the battery cooling panel assembly.

6. The battery cooling panel of claim 1, where the first outer panel is made of a polymeric material, and the panel insert is made of a polymeric material.

7. The battery cooling panel of claim 6, where the panel insert is more rigid relative to the first outer panel.

8. The battery cooling panel of claim 1, where the first outer panel is secured directly to the second outer panel via a heat seal or an adhesive seal.

9. The battery cooling panel of claim 1, where the first outer panel is made of aluminum.

10. The battery cooling panel of claim 1, where the first outer panel is soldered or welded to the second outer panel.

11. The cooling panel of claim 1, wherein the major surface of the panel insert is a first major surface, the panel insert comprising a second major surface.

12. The cooling panel of claim 11, wherein:
    the first outer panel comprises a second major surface facing the first major surface of the panel insert; and
    the second outer panel comprises a first major surface and a second major surface, the second major surface of the second outer panel facing the second major surface of the panel insert.

13. The cooling panel of claim 12, wherein the channels extend entirely through the panel insert and are open to both the first outer panel and the second outer panel.

14. The cooling panel of claim 12, wherein the second major surface of the second outer panel is secured directly to the second major surface of the first outer panel at the outer edge.

15. A battery cooling panel comprising:
    a first thin film sheet defined as a first cooling fin with a first major surface configured to contact a battery cell;
    a second thin film sheet sealed directly to the first thin film sheet about an outer edge; and
    a panel insert made of a polymeric material and positioned between the first thin film sheet and the second thin film sheet, the panel insert having a major surface with coolant flow channels, where the coolant flow channels are open to the first thin film sheet.

16. The battery cooling panel of claim 15, where the first thin film sheet completely covers the coolant flow channels.

17. The battery cooling panel of claim 15 where the panel insert is rigid relative to the first thin film sheet and the second thin film sheet.

18. The battery cooling panel of claim 15, where the first thin film sheet includes a polymeric material layer.

19. The battery cooling panel of claim 18, comprising a foil layer deposited on the polymeric material layer.

20. The battery cooling panel of claim 19, where the foil layer contacts the battery cell.

21. The battery cooling panel of claim 15, where the battery cell has a battery first major surface in contact with the first major surface of the first thin film sheet.

22. A battery module comprising:
a battery cooling panel comprising a first outer panel defined as a first cooling fin with a first major surface configured to contact a battery cell and a second major surface, a second outer panel with a first major surface and a second major surface, the second major surface of the second outer panel secured directly to the second major surface of the first outer panel at an outer edge, and a panel insert positioned between the second major surface of the first outer panel and the second major surface of the second outer panel, the panel insert having a major surface with coolant flow channels; and
a battery cell having a first battery major surface in contact with the first major surface of the first outer panel.

23. The battery module of claim 22, comprising:
a cartridge assembly that maintains the battery cooling panel against the battery cell.

24. The battery module of claim 23, where coolant flows to the battery cooling panel via a flow path through the cartridge assembly.

25. An electric vehicle comprising:
a battery module including a battery cooling panel comprising a first outer panel defined as a first cooling fin with a first major surface configured to contact a battery cell, a second outer panel secured to the first outer panel directly at an outer edge, and a panel insert positioned between the first outer panel and the second outer panel, the panel insert having a major surface having coolant flow channels formed therein, and a battery cell having a first battery major surface in contact with the first major surface of the first outer panel;
an electric vehicle power system coupled to the battery module; and
an electric vehicle drive system coupled to the battery module.

\* \* \* \* \*